(12) United States Patent
Burkhart et al.

(10) Patent No.: US 6,617,365 B2
(45) Date of Patent: *Sep. 9, 2003

(54) USE OF SILICON-POLYETHER COPOLYMERS IN THE PRODUCTION OF HIGH RESILIENCE POLYURETHANE FOAMS

(75) Inventors: Georg Burkhart, Essen (DE); Georg Feldmann-Krane, Mülheim (DE); Ingo Fleute-Schlachter, Essen (DE); Andreas Weier, Essen (DE)

(73) Assignee: Goldschmidt AG, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/726,089

(22) Filed: Nov. 29, 2000

(65) Prior Publication Data

US 2001/0004646 A1 Jun. 21, 2001

(30) Foreign Application Priority Data

Dec. 1, 1999 (DE) .......................... 199 57 747

(51) Int. Cl.⁷ ............................................. C08G 18/48
(52) U.S. Cl. ................. 521/112; 521/114; 521/117; 521/155; 521/170; 521/174
(58) Field of Search ................. 521/112, 114, 521/117, 155, 170, 174

(56) References Cited

U.S. PATENT DOCUMENTS

| | | | |
|---|---|---|---|
| 3,836,560 A | | 9/1974 | Prokai et al. |
| 4,150,048 A | | 4/1979 | Schilling, Jr. et al. |
| 4,242,466 A | | 12/1980 | Schilling, Jr. et al. |
| 5,306,737 A | * | 4/1994 | Burkhart et al. ............. 521/112 |
| 5,830,970 A | * | 11/1998 | Cobb et al. .................... 516/13 |
| 5,844,010 A | * | 12/1998 | Burkhart et al. ............. 521/112 |

FOREIGN PATENT DOCUMENTS

| | | |
|---|---|---|
| DE | 36 26 297 C1 | 7/1987 |
| EP | 0 041 216 | 12/1981 |
| EP | 0 043 110 | 1/1982 |
| GB | 907971 | 10/1962 |
| JP | 7-90102 | 4/1995 |

* cited by examiner

Primary Examiner—John M. Cooney, Jr.
(74) Attorney, Agent, or Firm—Frommer Lawrence & Haug LLP

(57) ABSTRACT

The invention relates to the use of silicone-polyether copolymers of the formula I

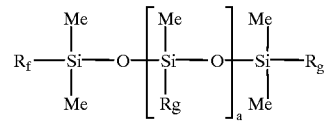

as surface-active substances in the production of polyurethane foams.

8 Claims, No Drawings

USE OF SILICON-POLYETHER COPOLYMERS IN THE PRODUCTION OF HIGH RESILIENCE POLYURETHANE FOAMS

RELATED APPLICATIONS

This application claims priority pursuant to 35 U.S.C. § 119, to German application 199 57 747.1, filed Dec. 1, 1999, incorporated herein by reference.

BACKGROUND OF THE INVENTION

1. Field of the Invention

This application provides for the use of certain silicone-polyethers copolymers as surface-active substances in the production of polyurethane foams.

2. Description of the Related Art

The processes employed in the prior art for producing polyurethane foams are differentiated into a number of types. These differences may concern either the chemicals used or the production machines employed. Thus, for example, a distinction is made between batchwise manufacture in boxes or molds and continuous manufacture on various types of foaming machines. Various groups of polyurethane foams can also be differentiated on the basis of the raw materials used and thus the foam types produced.

Thus, for example, rigid foams are, from their property profile and use alone, clearly distinguished from flexible foams, but even within the group of flexible foams, a distinction is made between hot-cure foam and high resilience foam (cold-cure foam). Here, the term high resilience foam refers to a highly elastic polyurethane foam which is formed by reaction of at least one bifunctional polyisocyanate, e.g. tolylene diisocyanate or diphenylmethane diisocyanate, with at least one polyol having at least two hydroxyl groups per molecule and, on average, a high proportion of primary hydroxyl groups. Due to the high content of primary OH groups, the polyols have a high reactivity toward the isocyanates.

In contrast to conventional polyurethane foams, namely hot-cure foams, a high crosslinking density is therefore obtained even during foaming. This has the advantages that the supply of relatively large amounts of energy during curing can usually be dispensed with and that the total time for curing the foams is shortened. However, a disadvantage is that the tendency to form closed-celled foams is increased and the processing latitude is therefore also narrowed. For the present purposes, processing latitude refers to the tolerance limits within which deviations from a formulation are permissible without the risk of not forming stable and simultaneously sufficiently open-celled or easily crushable foams.

For this reason, there is a demand for products having a less pronounced stabilizing character in production processes for polyurethane foams like hot-cure flexible slabstock foam which do not involve less reactive raw materials. In those cases in particular, the property of cell regulation in the surface zones of the foams is an important quality criterion. This is particularly true for molded high resilience foams, but even otherwise a consistent cell structure over the entire polyurethane foam body is desirable. Although at present a certain degree of stabilization is necessary even in the field of high resilience foam, particularly when using high-solids polyols in combination with tolylene diisocyanate mixtures as reactive component, hot-cure flexible foam stabilizers of the prior art, for example, are nevertheless not suitable as foam stabilizers for such processes.

Instead, significantly shorter and less stabilizing copolymers are normally used as foam stabilizers or cell regulators. These are normally either very short, unmodified siloxanes or products which are little modified relative to the siloxane and have pendant low molecular weight polyether substituents or other groups having a low polarity.

This prior art is reflected in a great number of different patents in the polyurethane field. Thus, for example, GB-A-907 971 stated, as early as 1960, that high molecular weight silicone oils cause an excessively large number of closed cells in the foam. For this reason, the patent cited proposes low molecular weight polydialkylsiloxanes having viscosities of from 2 to 9 centistokes at 25° C. These then guarantee an improved processing latitude (see column 2, lines 55 ff.). In general, many low molecular weight polydimethylsiloxanes or short polydimethylsiloxanes silicone-containing surface-active substances allows advantageous stabilization or cell regulation in the production of polyurethane foams.

DESCRIPTION OF THE INVENTION

The present invention accordingly provides for the use of silicone-polyether copolymers of the formula I

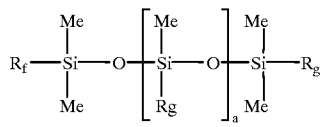

where $R_f$ is a polyether radical of the average formula $$-(Y)_c[O(C_xH_{2x}O)_pZ]_w,$$

where c=0 or 1, x=2 to 4, with mixtures of the corresponding monomers also being able to be used, p≧0, w=1 to 4, Z=a hydrogen atom or a monovalent organic radical, Y=a w+1-valent hydrocarbon radical which may also be branched, $R_g$ is an alkyl radical, preferably, having from 1 to 10 carbon atoms, or a substituted or unsubstituted aryl radical, where a is from 0 to 20, preferably from 2 to 8, with the proviso that c and p must not at the same time be 0, as surface-active substances in the production of polyurethane foams.

DESCRIPTION OF THE PREFERRED EMBODIMENTS

The AB silicone copolymers of the invention can also be used in combinations with one another or with other organic or silicone-containing surface-active substances.

The value of a is, as a person skilled in the art will know, to be regarded as an average value in the polymer molecule since the silicone-polyether copolymers to be used according to the invention are generally present in the form of equilibrated mixtures.

For the same reason, a corresponding preparation by equilibration of siloxanes usually also gives random mixtures of monofunctional, bifunctional and unfunctionalized siloxanes. Even when such a random mixture is used, it has been found that the effects in the production of polyurethane foams are distinctly superior to the property profile of the stabilizers customarily employed. If desired, a product having a high content of AB polymers can also be obtained by methods known from the literature, e.g. by anionic ring opening of hexamethylcyclotrisiloxane. It is obviously also possible for a random mixture obtained by equilibration to be separated subsequently both at the siloxane stage and at the copolymer stage.

The radicals $R_g$ are alkyl radicals, preferably having from 1 to 10 carbon atoms; e.g. methyl, ethyl, propyl, butyl or hexyl radicals, or aryl radicals, with phenyl radicals being preferred in the case of the latter. For ease of preparation and for price reasons, methyl radicals are preferred. Particular preference is given to silicone-polyether copolymers in which all the radicals $R_g$ are methyl radicals.

It is possible to use either one silicone or silicone-polyether copolymer or a plurality of silicones or silicone-polyether copolymers in combination with one another. In the latter case, the products used according to the invention are present in a proportion of more than about 20%, preferably more than 40%, particularly preferably more than 90%, of the silicone-containing substances of the total high resilience foam stabilizer. Here, the short-chain siloxanes or siloxane rings which are well known to persons familiar with this technical field and are always formed in small amounts in the preparation of siloxane chains by, for example, acid equilibration by literature methods owing to the thermodynamic circumstances are not taken into account separately.

The polyethers may comprise ethylene oxide, propylene oxide and up to about 20% of butylene oxide or higher alkylene oxides and contain both hydroxyl groups and ether or ester groups, such as $C_1$–$C_6$-alkyl ether or ester groups, as end groups. Usually, polyether groups in the molecular weight range from about 100 to about 4000, preferably from 100 to 1500, particularly preferably from 200 to 1000, are used, depending on the chain length of the siloxane part. The compounds are prepared as described in the literature for silicone-polyether copolymers, e.g. by hydrosilylation of a double-bond-containing polyether, if desired in admixture with other double-bond-containing polyethers if mixtures of various stabilizers according to the invention are to be obtained. Another possible way of preparing the corresponding Si—OC-linked structures is equilibration catalyzed by iron(III) chloride as is known from the literature, e.g. of chlorotrimethylsilane with cyclic polydimethylsiloxanes. Subsequent reaction of the resulting Si—Cl-functionalized polydimethylsiloxanes with hydroxyl-containing polyoxyalkylene copolymers under basic conditions and subsequent filtration of the amine salts formed and, if appropriate, removal of solvent used by distillation gives the desired block copolymers.

EXAMPLES

The siloxanes used have the following average formula:

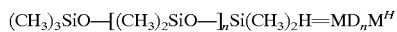

The siloxanes were synthesized by known methods, e.g. by acid equilibration of mixtures of hexamethyldisiloxane, octamethylcyclotetrasiloxane and α,ω-dihydrogenpolydimethylsiloxane (e.g. $M^H D_6 M^H$). A person skilled in the art will know that this forms a siloxane mixture having a random distribution and comprising, on average, 2 mol of $MD_n M^H$ and 1 mol each of $M^H D_n M^H$ and $MD_n M$.

Example 1

331.5 g (0.65 mol) of polyether having the average composition $CH_2$=CH—$CH_2O$—$(C_2H_4O)_6$—$(C_3H_6O$—$)_3$ $CH_3$ were placed in a flask provided with stirrer, thermometer, gas inlet and reflux condenser. Nitrogen was passed through the apparatus and the polyether was heated to 90° C. 16 mg of cis-$[H_2PtCl_6]$ was then added, after which 185.4 g (0.5 mol) of siloxane having the average composition $MD_3 M^H$ were added dropwise over a period of 30 minutes while stirring vigorously. Slight evolution of heat was observed. After the dropwise addition was complete, the mixture becomes clear. The mixture was allowed to react further for another 2 hours. The SiH conversion was 99.5% (determined by means of hydrogen elimination using n-butanol in alkaline medium). This gave a clear, yellowish product.

To remove the volatile, unmodified siloxanes of the $MD_n M$ type, the product obtained was treated at 150° C. and 0.5 mbar. The resulting product was designated as stabilizer 1.

Example 2

Under the conditions of Example 1, 322.4 g (0.65 mol) of polyether having the average composition $CH_2$=CH—$CH_2O$—$(C_2H_4O$—$)_6(C_3H_6O$—$)_3H$ and 259.6 g (0.5 mol) of siloxane having the average composition $MD_5 M^H$ were reacted in the presence of 18 mg of cis-$[H_2PtCl_6]$. The SiH conversion was 98.9%. The resulting product is designated as stabilizer 2.

Example 3

Under the conditions of Example 1, 421.2 g (0.39 mol) of polyether having the average composition $CH_2$=CH—$CH_2O$—$(C_2H_4O$—$)_{14}(C_3H_6O$—$)_7H$ and 133.5 g (0.3 mol) of siloxane having the average composition $MD_4 M^H$ were reacted in the presence of 17 mg of cis-$[H_2PtCl_6]$. The SiH conversion was 100%, and the product displayed a slight turbidity. The resulting product is designated as stabilizer 3.

Example 4

Under the conditions of Example 1, 380.9 g (0.65 mol) of polyether having the average composition $CH_2$=CH—$CH_2O$—$(C_2H_4O$—$)_{12}H$ and 222.5 g (0.5 mol) of siloxane having the average composition $MD_4 M^H$ were reacted in the presence of 18 mg of cis-$[H_2PtCl_6]$. The SiH conversion is 100%. The resulting product is designated as stabilizer 4.

Example 5

Not According to the Invention

Under the conditions of Example 1, 34.9 g (0.22 mol) of polyether having the average composition $CH_2$=CH—$CH_2O$—$(C_3H_6O$—$)_2H$, 111.1 g (0.22 mol) of polyether having the average composition $CH_2$=CH—$CH_2O$—$(C_2H_4O$—$)_6(C_3H_6O$—$)_3H$ and 100 g (0.16 mol) of siloxane having the average composition $M^H D_{6.5} M^H$ were reacted in the presence of 3.8 mg of cis-$[H_2PtCl_6]$. The SiH conversion was 100%. The resulting product was designated as comparison 1.

When used for producing high resilience polyurethane foams in molds, these compounds according to the invention stabilized the molded foams sufficiently and regulated the cell structure right into the surface regions. The foam cushions obtained were crushed comparatively easily.

To test the substances used according to the invention, the compounds were foamed in the concentrations indicated in a known manner in customary formulations used, for example, for producing automobile seats or furniture cushions.

The following formulations were used for the use tests:

|  | Formulation 1 | Formulation 2 |
|---|---|---|
| Polyol 1 | 100 parts | 50 parts |
| Polyol 2 |  | 50 parts |
| Water | 3.0 parts | 4.0 parts |
| Diethanolamine | 2.0 parts | 1.2 parts |
| Tegoamin 33[(1)] | 0.4 part | 0.4 part |
| Tegoamin BDE[(2)] | 0.05 part | 0.05 part |
| T 80[(3)] | 37.8 parts | 51.1 parts |
| Stabilizer | variable | variable |

Polyol 1 commercial polyether polyol, MW = 4800
Polyol 2 commercial copolymer polyol, contains 40% of styrene-acrylonitrile copolymer
[(1)]Tegoamin 33 commercial amine catalyst from Goldschmidt AG
[(2)]Tegoamin BDE commercial amine catalyst from Goldschmidt AG
[(3)]T 80 commercial tolylene diisocyanate Experimental Procedure:

The components listed in formulation 1, with the exception of the T 80 but including the stabilizer 1 according to the invention, were mixed for 1 minute in a 2 liter beaker using an impeller stirrer at 1000 rpm. After addition of the T 80, the mixture was stirred for a further 7 seconds at 2500 rpm. The reaction mixture was introduced into a heated aluminum mold (40×40×10 cm). After exactly 6 minutes, the foam was removed from the mold and the force for pressing the cells open is measured as described.

The assessment of the foams produced using the substances according to the invention is made according to the following criteria:

1) Cell structure: the typical high resilience foam has an irregular cell structure from which it gains, inter alia, its good elastic properties. The irregular cell structure is therefore expected as a matter of principle.

2) Surface zone regulation: the foam cushion should have a good cell structure throughout from the core to the skin. A significantly coarsened surface zone is regarded as a fault and is to be avoided.

The evaluation extends from good through slightly disrupted, strongly disrupted to ineffective.

3) Ability to be crushed: the ability to crush the cushion is a criterion for ready removal from the mold. Foam cushions which can only be crushed by application of a large force tend to become torn and destroyed during removal from the mold.

To determine the force required for crushing, the indentation resistance (ILD) was measured at an indentation depth of 50% on the freshly demolded foams, without them firstly being pressed, by means of a pressure testing machine.

| Formulation 1 | | | | |
|---|---|---|---|---|
| | Concentration/ parts | Cell structure | Number of cells/ cm | Appearance of the surface zones | Crushing force (N) |
|---|---|---|---|---|---|
| Stabilizer 1 | 0.1 | irregular | 10 | good | 1291 |
| Stabilizer 2 | 0.05 | irregular | 10 | good | 1470 |
| Stabilizer 3 | 0.5 | irregular | 13 | good | 1638 |
| Stabilizer 4 | 0.05 | irregular | 9 | good | 1431 |
| Comparison 1 | 0.1 | irregular | 10-11 | good | 1741 |
| Comparison 1 | 0.05 | irregular | 10 | slightly disrupted | 1565 |

As the results for formulation 1 in the table show, a foam cushion which has an irregular cell structure as desired for high resilience foam is obtained in all cases. The substances used according to the invention allow defect-free regulation of the sensitive surface zones. Surprisingly, the force required for crushing the foam in the case of the stabilizers of the invention is sometimes exceptional low (e.g. relative to the comparative substance 1 which is not according to the invention, particularly in view of the high possible use concentration, e.g. in the case of stabilizer 3). High crushing forces can cause problems with removal from the mold in industrial production and are therefore undesirable.

The foaming results in formulation 2 are shown in the following table.

| Formulation 2 | | | | | |
|---|---|---|---|---|---|
| | Concentration/ parts | Cell structure | Number of cells/ cm | Appearance of the surface zones | Crushing force (N) |
|---|---|---|---|---|---|
| Stabilizer 1 | 0.5 | irregular | 15 | good | 1073 |
| Stabilizer 2 | 0.05 | irregular | 15 | good | 561 |
| Stabilizer 3 | 0.18 | irregular | 10 | good | 725 |
| Stabilizer 4 | 0.1 | irregular | 12 | good | 671 |
| Comparison 1 | 0.18 | irregular | 14 | good | 1764 |

In this formulation in particular, the substances of the invention display an interesting balance between sufficient stabilization (cf. comparison 1, used in the amount which just gives sufficient regulation in this formulation) and low crushing forces. Here, even low use concentrations are sometimes sufficient for good surface zone regulation. On the other hand, stabilizer 1, for example, can also be used in a high concentration without resulting in a great increase in the values for crushing.

The above description is intended to be illustrative and not limiting. Various changes and modifications in the embodiments described herein may occur to those skilled in the art. Those changes can be made without departing from the scope or spirit of the invention.

What is claimed is:

1. A process for preparing a polyurethane foam which comprises reacting a polyol and an isocyanate in the presence of a silicone-polyether copolymer of the formula

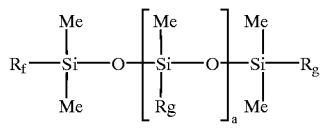 (I)

where $R_f$ is a polyether radical of the average formula

where c=0 or 1, x=2 to 4, with mixtures of the corresponding monomers also being able to be used, $p \geq 0$, w=1 to 4, Z=hydrogen atom or a monovalent organic radical, Y=a w+1-valent hydrocarbon radical which may also be branched, $R_g$ is an alkyl radical or a substituted or unsubstituted aryl radical, where a is from 0 to 20, with the proviso that c and p must not at the same time be 0.

2. The process according to claim 1, wherein Rg is an alkyl radical having 1 to 10 carbon atoms or a substituted or unsubstituted aryl radical.

3. The process according to claim 1, wherein $R_g$ is methyl, ethyl, propyl, butyl, hexyl or phenyl A is from 2 to 8

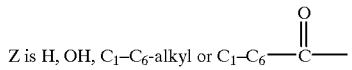

4. The process according to claim 1, wherein

A is greater than or equal to 2 and less than or equal to 8.

5. The process according to claim 1, where the silicone-polyether copolymer is combined with an organic or silicone-contain surface-active substance.

6. A polyurethane foam obtained by the process according to claim 1.

7. In a process for preparing a polyurethane foam, the improvement which comprises adding a silicone-polyether copolymer of the formula

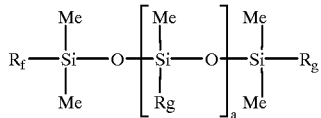 (I)

where $R_f$ is a polyether radical of the average formula

where c=0 or 1, x=2 to 4, with mixtures of the corresponding monomers also being able to be used, $p \geq 0$, w=1 to 4, Z hydrogen atom or a monovalent organic radical, Y=a w+1-valent hydrocarbon radical which may also be branched, $R_g$ is an alkyl radical or a substituted or unsubstituted aryl radical, where a is from 0 to 20, with the proviso that c and p must not at the same time be 0 as a surface active substance.

8. The process according to claim 7, wherein the silicone-polyether copolymer is combined with one or more different organic or silicone-containing surface-active substances.

* * * * *